Figure 1:
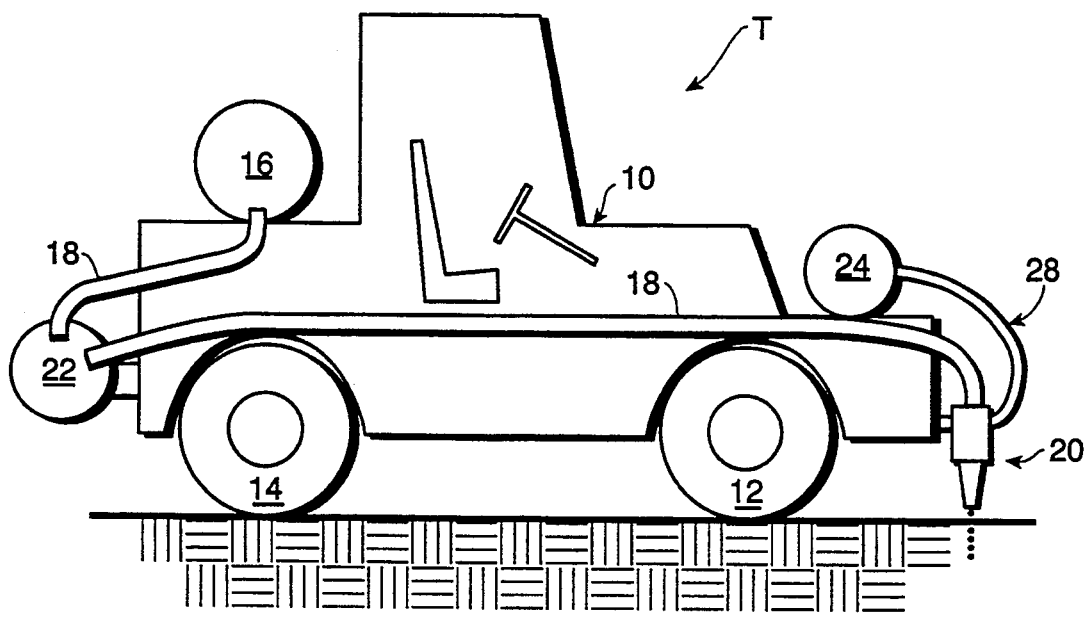
Figure 2:
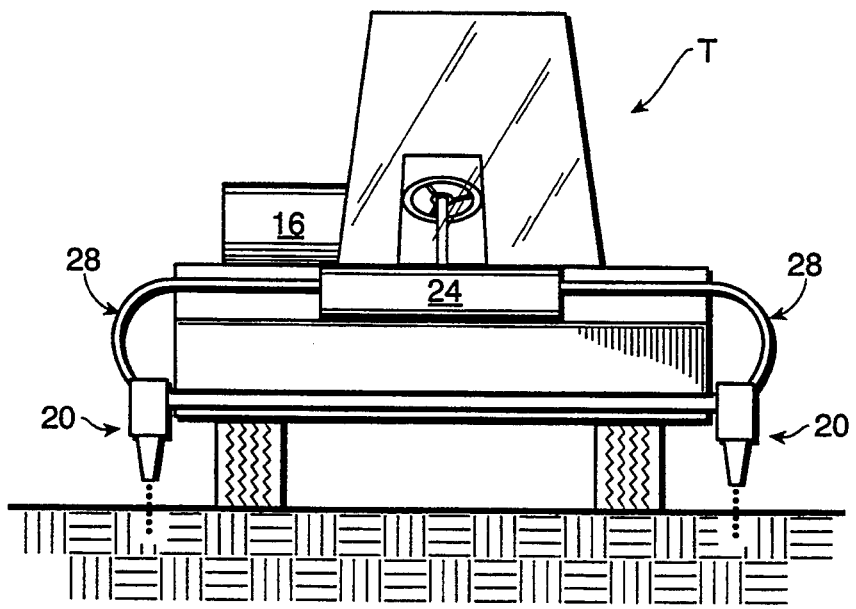
Figure 3:
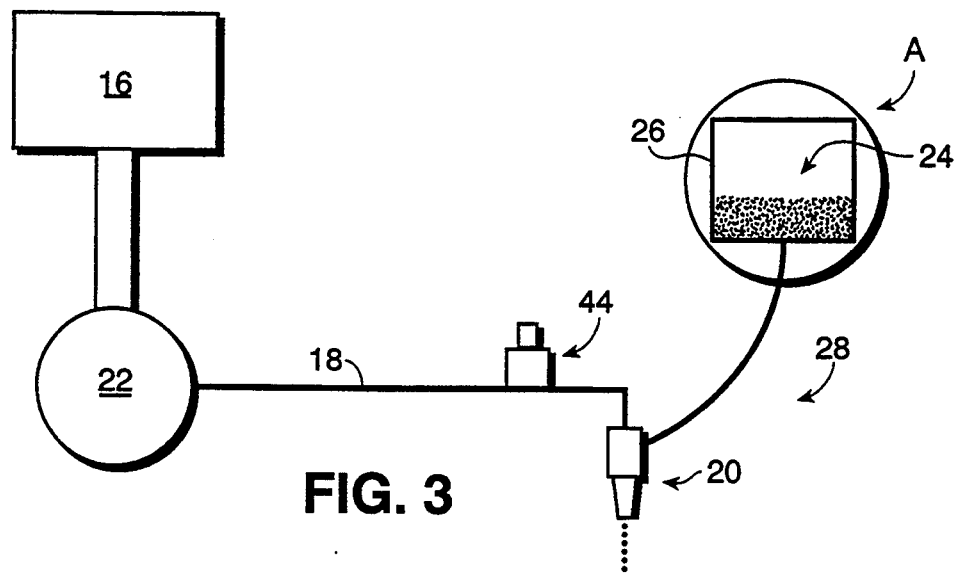

United States Patent [19]
Monroe

[11] Patent Number: 5,370,069
[45] Date of Patent: Dec. 6, 1994

[54] APPARATUS AND METHOD FOR AERATING AND/OR INTRODUCING PARTICULATE MATTER INTO A GROUND SURFACE

[75] Inventor: Michael Monroe, Buena Park, Calif.

[73] Assignee: Injection Aeration Systems, Santa Monica, Calif.

[21] Appl. No.: 25,259

[22] Filed: Mar. 2, 1993

Related U.S. Application Data

[63] Continuation of Ser. No. 758,764, Sep. 12, 1991, abandoned.

[51] Int. Cl.⁵ .............................................. A01C 15/00
[52] U.S. Cl. ...................... 111/127; 111/118; 172/21; 451/102
[58] Field of Search ................ 111/118, 127, 129; 172/21; 239/433, 428.5, 434.5; 51/439, 436, 263; 222/92; 134/102; 175/67, 424; 37/63

[56] References Cited

U.S. PATENT DOCUMENTS

| | | | |
|---|---|---|---|
| 3,875,876 | 4/1975 | Pustovoit et al. | 111/127 |
| 4,193,550 | 3/1980 | Juttelstad et al. | 51/439 |
| 4,218,855 | 8/1980 | Wemmer | 51/439 |
| 4,264,018 | 4/1981 | Warren | 222/92 |
| 4,449,332 | 5/1984 | Griffiths | 51/439 |
| 4,545,157 | 10/1985 | Saurwein | 239/433 |
| 4,666,083 | 5/1987 | Yie | 239/433 |
| 4,807,544 | 2/1989 | Cross et al. | 111/127 |
| 4,945,688 | 8/1990 | Yie | 51/439 |
| 4,995,202 | 2/1991 | Gardner et al. | 51/439 |
| 5,018,670 | 5/1991 | Chalmers | 51/439 |
| 5,020,556 | 6/1991 | Lamminen et al. | 134/102 |
| 5,054,249 | 10/1991 | Rankin | 51/439 |
| 5,083,678 | 1/1992 | Waring | 222/92 |
| 5,101,745 | 4/1992 | Podevels et al. | 172/21 |

FOREIGN PATENT DOCUMENTS

| | | | |
|---|---|---|---|
| 438384 | 8/1974 | U.S.S.R. | 111/127 |
| 660614 | 5/2979 | U.S.S.R. | 111/127 |

OTHER PUBLICATIONS

Toro brochure, "Hydrojet 3000", 1992.

Primary Examiner—Randolph A. Reese
Assistant Examiner—Spencer Warnick
Attorney, Agent, or Firm—Robert J. Schaap

[57] ABSTRACT

An apparatus and a method for introducing a particulate matter along with a driving liquid, such as water, into a ground surface. The apparatus is also highly effective for perforating and thereby aerating the ground surface. The particulate matter may preferably adopt the form of a powder like substance often referred to as "polymer" and which is injected into the ground for purposes of acting as a plant food or a plant additive in various agricultural operations. The apparatus utilizes an injector device for mixing the polymer or other particulate matter with the driving liquid, such as water, at a point in close proximity to the ground surface so that there is no pre-mixing of the particulate matter and the driving liquid. The driving liquid is pumped to the injector at a high pressure and introduced into a high pressure chamber of the injector. The liquid is then forced through a very small diameter nipple opening leading to a low-pressure chamber. This will, in turn, cause a venturi effect in the low pressure chamber and which also causes a sucking or introduction of the particulate matter into the low pressure chamber where the particulate matter and the liquid are mixed and then injected directly into a ground surface. The particulate matter is contained within a collapsible bag such that the bag will collapse around the particulate matter as it is periodically withdrawn therefrom.

15 Claims, 2 Drawing Sheets

APPARATUS AND METHOD FOR AERATING AND/OR INTRODUCING PARTICULATE MATTER INTO A GROUND SURFACE

RELATED APPLICATION

This application is a continuation of my co-pending U.S. patent application Ser. No. 758,764, filed Sep. 12, 1991, now abandoned, for "Apparatus and Method for Aerating And/Or Introducing Particulate Matter Into A Ground Surface.

BACKGROUND OF THE INVENTION

1. Field of the Invention

This invention relates in general to certain new and useful improvements in an apparatus and method for aerating a ground surface and/or injecting material into a ground surface, and more particularly, to an improved apparatus and method for mixing a particulate matter with a driving liquid close to a point of injection into a ground surface or otherwise aerating a ground surface with a combination of air and a driving liquid.

2. Brief Description of the Prior Art

It is periodically necessary to introduce plant foods or additives which assist in plant growth in many agricultural operations. This is particularly true in the case of fruit trees wherein a periodic introduction of a solid particulate matter, often known as "polymer", is introduced into the ground surface in proximity to or adjacent to the roots of the plant. Furthermore, it is oftentimes necessary to aerate the ground area at or adjacent to growing plants.

One of the conventional and widely used methods of perforating a ground surface for purposes of aerating the same is to manually punch holes into a ground surface with a large pole or similar implement. When it is desired to introduce a particulate matter such as a polymer or plant food into a ground surface, the same technique is employed, namely holes are manually punched into the ground at the area in which it is desired to introduce the plant food or additive. Thereafter, the addition of plant food is then manually introduced into the holes.

Since this prior art process of perforating the ground is inherently slow, several laborers are required to literally perform this rather arduous work. Not only is this process quite slow, but as a result, but is also carries the attendant very high labor costs. Notwithstanding the slowness and the high cost associated with the prior art technique of introducing particulate matter into a ground surface, the technique of punching holes with a sharp implement such as a pointed pole, can easily damage the root system of the very plant to which the additive or plant food is being added. Since the personnel have no way of knowing where the roots of the plant might lie under the ground surface, they inevitably damage one or more of the roots of an existing plant and which can sometimes result in the death of or serious injury to that plant. Moreover, the punching of holes in the ground surface also ruins the existing ground cover or grass on the surface.

There are several commercially available sandblasting machines which drive sand and water under high pressure at an existing surface for purposes of removing a portion of that surface. In the case of the sandblasting machine, water is introduced into a high pressure chamber and then directed toward an existing surface. Air is used to move sand into contact with the water by literally forcing a movement of surface sand particles. The machine may also use a venturi effect in order to suck in sand from the supply source and to thoroughly mix the water with the sand.

In a conventional and blasting operation, the water serves as part of the blasting agent along with the sand. In other words, the Water and the sand combine to provide the abrasive agents which causes removal of a portion of a surface by wearing away the same. Furthermore, there is no problem of agglomeration of the water with the sand and which problems of agglomeration often exist with other materials.

OBJECTS OF THE INVENTION

It is, therefore, one of the primary objects of the present invention to provide an apparatus for introducing particulate matter into or aerating a ground surface by perforating the ground surface with a high pressure stream of water.

It is another object of the present invention to provide an apparatus for introducing particulate matter into a ground surface by perforating the ground surface and driving the particulate matter into the perforated ground with a driving liquid.

It is a further object of the present invention to provide an apparatus of the type stated in which a particulate matter is drawn into a low pressure chamber by virtue of a venturi effect created by a high pressure stream of liquid forced into a low pressure chamber and which is thereafter mixed with the liquid and forced into a ground surface.

It is an additional object of the present invention to provide an apparatus of the type stated which is highly efficient in operation and which eliminates the previously encountered slow operation and attendant high cost of introducing plant foods and/or additives into a ground surface.

It is another salient object of the present invention to provide a method of aerating a ground surface by introducing a driving liquid under pressure into the ground surface along with water.

It is still another object of the present invention to provide a method of introducing a plant food or additive into a ground surface by mixing the same with a driving liquid and introducing the additive or plant food into the ground surface along with the driving liquid.

With the above and other objects in view, my invention resides in the novel features of form, construction, arrangement and combination of parts presently described and pointed out in the claims.

BRIEF SUMMARY OF THE INVENTION

In broad terms, the present invention relates to both an apparatus and a method for perforating a ground surface for purposes of aerating the same. Alternatively, the apparatus and method relates to the introduction of a particulate matter into the ground surface. The forming of the perforations and the introduction of the particulate matter are both closely related and form part of the same inventive concept.

The apparatus of the invention comprises a source of liquid, such as water and which may be carried in a water tank. This apparatus also comprises a source of a particulate matter, which in the preferred embodiment of the invention, may adopt the form of a plant food or plant additive. An injector forms part of the apparatus and is located in close proximity to the ground surface so that the particulate matter can be introduced in a water stream almost immediately prior to injection with the ground surface. The injector comprises a housing with an inlet port for receiving water under pressure.

Water is initially pumped into a high pressure chamber of the housing of a the injector by a pump which forms part of the apparatus. This pump generates a pump delivery pressure which is usually a high pressure. As the water enters the injector, it then passes through a nipple having a very small nipple orifice. Inasmuch as the water is introduced into the injector housing at a constant volume and with a substantial pressure on the delivery side, the water pressure will remain high as the water passes through the nipple opening, also as a high pressure water stream. This high pressure water stream is immediately introduced into a low pressure chamber and creates a low pressure region surrounding the high pressure water stream. The particulate matter is introduced into the low pressure chamber of the housing at the point where a venturi effect is created, that is where the high pressure water stream enters the low pressure chamber at a high pressure. This low pressure chamber is often referred to as a venturi chamber. Thus, the particulate matter is effectively drawn or sucked into the low pressure chamber.

When the particulate matter enters the low pressure chamber, it is picked up by the water stream and carried through a discharge nozzle directly to the ground surface. Even if the particulate matter is water absorbent, it has very little opportunity to absorb water due to the high rate of speed of the high pressure stream of water which literally carries the particulate matter directly into the ground surface.

The high pressure water stream is caused by maintaining a pump delivery pressure in the flow path of water while maintaining the same input volume. This high pressure maintained on the water stream is sufficient to perforate the ground surface to a desired depth and introduce the particulate matter and water into the ground surface.

In a preferred embodiment, the particulate matter is contained in a flexible container which can collapse about the particulate matter in that container as particulate matter is withdrawn therefrom. In this way, there is no vacuum created inside of the particulate matter chamber and there is no need for venting the particulate matter chamber to the external atmosphere. The particulate matter may be a solid or even a liquid for that matter and possibly even a gas.

The apparatus of the invention is preferably mounted on and carried by a tractor with one or more injectors located in close proximity to the ground surface.

In many cases, the particulate material is very hygroscopic and will normally form a gel or thick slurry when mixed with water. If this gel or viscous composition was formed in a supply line, it would interfere with the operation of the apparatus. Accordingly, the particulate matter is not mixed with the driving liquid, such as water, until the two are brought into contact in the venturi chamber, and that is very close to the ground surface. The particulate matter carried in the water stream as a very high pressure stream is immediately discharged through the exit nozzle, and thus, there is little or no possibility of gelling and interfering with the system operation.

The present invention also provides a method of perforating a ground surface for purposes of aerating the same and also for purposes of introducing a particulate matter into the ground surface. This method relies upon the passage of the driving liquid from a high pressure chamber into an area of reduced pressure through a venturi orifice. The particulate matter is drawn into the venturi chamber and mixed with the driving liquid therein. Thereafter, in accordance with the method, the mixture of particulate matter and driving liquid is then passed through a discharge nozzle and into a ground surface.

The term "plant" is often generically used to include and encompass small plants, bushes, shrubbery and trees. Thus the term "plant" is used in that generic sense in the case of the present invention. Also the term "ground surface" is used herein to mean the surface of the earth, as opposed to any synthetic manmade surface, and usually means and includes the immediate crust as well as the dirt to a distance of eighteen or more inches below the actual ground surface or crust.

This invention possess many other advantages and has other purposes which will be made more fully apparent from a consideration of the forms in which it may be embodied. One or more of these forms is more fully illustrated in the following detailed description of the invention and in the accompanying drawings. However, it is to be understood that this detailed description and the accompanying drawings are only set forth for purposes of illustrating the general principles of the invention and are not to be taken in a limiting sense.

BRIEF DESCRIPTION OF THE DRAWINGS

Having thus described the invention in general terms, reference will now be made to the accompanying drawings in which:

FIG. 1 is a side elevational view of a vehicle on which the apparatus of the present invention has been incorporated for aerating a ground surface and/or introducing a particulate matter into the ground surface;

FIG. 2 is a side elevational view of the vehicle of FIG. 1 showing the positioning of the discharge nozzles of the apparatus;

FIG. 3 is a schematic view showing some of the major components of the apparatus of the present invention; and FIG. 4 is a sectional view showing the interior portions of an injector forming part of the apparatus of the invention.

DETAILED DESCRIPTION OF PREFERRED EMBODIMENTS

Referring now in more detail and by reference characters to the drawings which illustrate a preferred embodiment of the invention, A designates an apparatus for either aerating a ground surface or introducing a particulate matter into a ground surface. Some of the major components of this apparatus A, which are more fully illustrated in schematic form in FIG. 3, are well known and these conventional components will not be described or illustrated in detail herein.

The apparatus of the present invention is frequently mounted on a tractor driven by an internal combustion engine, as for example, the tractor T, illustrated in FIGS. 1 and 2 of the drawings. The tractor is of a conventional construction including a body 10 and a pair of front wheels 12 and a pair of rear wheels 14. Mounted on the tractor T is a water tank 16 having a water supply line 18 connected to an injector 20, as hereinafter described in more detail. In the embodiment of the invention as illustrated, a pair of injectors 20 are provided with each one located adjacent one of the two front wheels 12 of the tractor T. Thus, and for this purpose, a T-divider would be located in the supply line 18 to divert water supply to each of the injectors 20.

It should be understood at this point, in connection with the present invention, that while a pair of injectors are illustrated, any number of injectors could be provided. Usually, two injectors are required if the particulate matter is to be injected into the ground surface as a tractor moves between two rows of plants. However, and depending upon the end use, any number of injectors could be used. Moreover, the injectors can be located in essentially any position on the tractor T such that they do not interfere with the operation of the tractor.

The apparatus of the invention also includes a means for delivery for water under pressure, e.g. a pump 22 on the down-stream side of the water supply tank 16 for pumping the water under pressure to the injectors 20. The pump is preferably of a type which will pump the water at a constant volume and under high pressure to the injectors. Since this pump is of a conventional construction, it is neither illustrated nor described in any further detail herein.

The apparatus of the invention also includes a particulate matter supply tank 24 which may also be mounted on the tractor T. It is important to maintain many types of particulate matter in a generally moisture free environment. In the case of the present invention, one of the particulate matters frequently injected into the ground surface as a very hygroscopic polymer composition which is used as a plant additive. Further, entrainment of moisture in the air which contacts this polymer will cause an agglomeration and resultant formation of lumps of polymer which could easily interfere with its passage through supply lines and the ultimate injection into the ground surface. The polymer when mixed with any minimal amount of water will result in a rather viscous mixture which not only clogs the supply lines and the injectors, but it also requires a substantial pumping force to push the viscous material through the supply lines and the injectors.

In order to avoid the water entrainment problems, the polymer is contained within a flexible plastic bag or other container 26 disposed within the particulate matter supply tank 24. This plastic bag is completely sealed so that there is no introduction of air which might carry moisture into the polymer or other particulate matter. The polymer or other particulate matter is withdrawn from the flexible collapsible container 26 through supply lines 28 which lead directly to the injectors 20.

Inasmuch as the particulate matter and water are not mixed or brought into contact with one another until they reach the injectors, and moreover, since the injectors are located very close to the ground surface at the point of injection of the particulate matter, there is a resultant mixture of the water and particulate matter almost immediately above the ground surface. Consequently, there is little or no possibility of the particulate matter absorbing water and agglomerating and thereby plugging up the apparatus of the invention.

Figure 4:
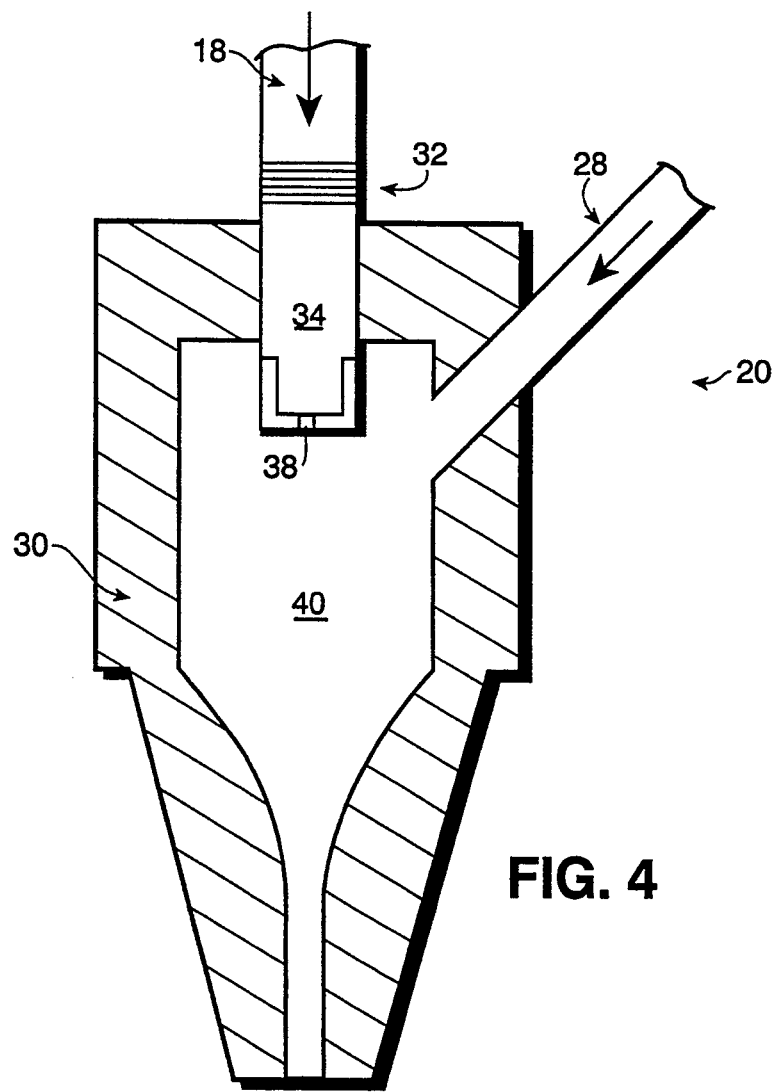

FIG. 4 more fully illustrates an injector 20 forming part of the apparatus of the present invention. The injector 20 is comprised of an outer housing 30. The upper end of the outer housing 30 is provided with a fitting 32 for receiving the water supply line 18 which carries water under pressure. The water in the water supply line 18 is introduced to the injector at a pressure of about 3,000 lbs. per square inch. The water which enters into the fitting 32 is introduced directly into a nipple 34 having a very small diameter nipple opening or orifice 38. Inasmuch as water is introduced under pressure, the water passing through the nipple orifice 38 will also be under very high pressure, possibly as much as 3,000 lbs. per square inch or greater. The water which passes through the nipple opening 38, while under a very high pressure, enters into a low pressure chamber 40. Thus, it can be observed that as water passes through the nipple opening 38, it will create a venturi effect within the chamber 40 and thus, the chamber 40 is often referred to as a "venturi chamber."

In approximately the region where water passes through the nipple opening 38, the particulate matter is introduced into the venturi chamber through the particulate matter delivery tube 28, thereby creating a vacuum at the outlet of the particulate matter tube 28. The particulate matter is thereupon drawn or effectively sucked into the venturi chamber 40. Since the particulate matter is then immediately carried by the water stream through the discharge nozzle 42 at the lower end of the housing 30, the water carried particulate matter is thereupon literally forced into the ground surface. It can be observed a water stream under very high pressure will literally penetrate the ground surface for a substantial distance e.g. 12 to 18 inches or more. The particulate matter, such as the polymer, is thereupon carried directly into the ground surface.

It can be seen that the present invention provides a very unique concept for introducing particulate matter into a ground surface by using a high pressure liquid carrier. Furthermore, the present invention provides a unique concept of withdrawing the particulate matter from a sealed chamber by use of a venturi effect device. Consequently, the present invention enables the particulate matter to be introduced into the ground surface in a very efficient manner and on a low cost basis which was heretofore virtually unavailable.

In one of the important aspects of the invention, the particulate matter is not carried into the ground in an air stream which could seriously damage the particulate matter itself. To inject a particulate matter, such as a powder, in an air stream proves to be relatively ineffective since it literally damages the physical characteristics of the particulate matter. Furthermore, the particulate matter is not introduced into the ground in a slurry, that is where a substantial amount of water is used to carry the particulate matter. This is due to the fact that in many cases there is a time period required for the particulate matter to absorb the liquid such as water.

In the present invention and in connection with the typical polymer materials used at least three to six seconds is required for the polymer to absorb the water and become a viscous mass. However, the polymer is so quickly introduced into the ground surface, that there is essentially little or no time to absorb the water while in the high pressure water stream. Thus, the polymer is introduced into the ground almost in a dry form.

A valve means, such as a metering valve or control valve 44 can also be located in the water delivery line 18. This valve can control the time between discharges from the injector if a continuous deposition is not required. In most cases, the particulate matter is introduced into the ground in individual discharges at selected distances, that is where plants are located. Thus, the metering valve 44 may be operated by a control means, such as a timing mechanism to periodically cause a discharge of the particulate matter or otherwise, it can be trigger operated through manual control of an operator.

It can also be observed that the driving liquid such as water under high pressure is actually injected first into the ground surface from the injector. This is due to the fact that the water first passes through the nipple opening and the passage of water therefrom creates the venturi effect. Consequently, the water effectively bores a hole in the ground. Immediately thereafter, the particulate matter is drawn into the venturi chamber and then carried by the water into the ground surface. Inasmuch as the polymer is effectively and highly efficiently introduced into the ground surface, it has been found that ¼ pound of polymer can be used for 400 square feet of ground surface. The time frame in which there is an actual discharge can vary although it has been found that 100 milliseconds is sufficient for perforating the ground and introducing the polymer. Moreover, when a tractor is used for moving the apparatus, it has been found that a polymer can be ejected approximately every four seconds.

Thus, there has been illustrated and described a unique and novel apparatus and method for perforating and thereby aerating a ground surface and also for introducing a particulate matter into a ground surface on a highly efficient basis. Thus, the present invention fulfills all the objects and advantages which have been sought therefore. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. An apparatus for forming holes in a ground surface and thereafter introducing a highly hygroscopic particulate matter into the holes formed in the ground surface from an injector closely spaced to the ground surface but not penetrating the ground surface, said apparatus comprising:

a) means for delivery of a liquid under pressure from a supply thereof;

g) an injector for receiving the liquid from the means for delivery and forming a high pressure stream of liquid;

c) a venturi chamber in said injector and receiving the high pressure stream of liquid at a flow rate sufficient to cause a venture effect in said chamber;

d) a particulate matter inlet port in said injector for enabling a charge of a highly hygroscopic particulate matter to be brought into said chamber by virtue of a negative pressure caused by the venturi effect and enabling the particulate matter to be brought into contact with the high pressure stream of liquid to form a particulate matter entrained stream of liquid;

e) said high pressure stream of liquid first being introduced into said venturi chamber and then starting the venturi effect after the high pressure stream of liquid has first entered the chamber so that the particulate matter is drawn into the venturi chamber after the high pressure stream of liquid first enters the chamber;

f) a discharge port in very close proximity to the ground surface to permit ejection of the high pressure stream of liquid without particulate matter therein immediately followed by the particulate matter entrained stream of liquid into the hole in the ground surface and deposition of the particulate matter into the hole in the ground surface;

g) valve means for regulating delivery of the high pressure stream of liquid to the injector and allowing the high pressure stream of liquid to be delivered into said venturi housing before the charge of particulate matter has been drawn into the chamber and where there is a stream of liquid under high pressure remaining and entering the injector after the charge of particulate matter has been ejected, such that liquid under high pressure without entrained particulate matter first contacts the ground surface to form a hole followed by introduction of the particulate matter entrained stream of liquid into the hole so that the particulate matter effectively enters a pre-formed hole; and h) the particulate matter inlet port being closely spaced with respect to the high pressure stream of liquid entering the injector and the discharge port being closely spaced to the ground surface so that the amount of time the particulate matter remains in contact with the high pressure stream of liquid in the injector is relatively short so that the particulate matter absorbs very little water before entering the ground.

2. The apparatus of claim 1 further characterized in that said apparatus is mounted on and movable with a vehicle for selectively introducing particulate matter into the ground at selected intervals.

3. The apparatus of claim 1 further characterized in that the liquid is water and the particulate matter is a plant additive polymer.

4. The apparatus of claim 2 further characterized in that said injector comprises:

a) an inlet port to receive the high pressure stream of liquid, b) a venturi orifice located downstream from said liquid inlet port through which the liquid passes causing a venturi effect on the downstream side of said orifice in said venturi chamber which is a low pressure chamber, and c) said particulate matter inlet port is located to introduce particulate matter into said venturi chamber.

5. The apparatus of claim 4 further characterized in that said discharge port is located immediately downstream of said orifice.

6. The apparatus of claim 1 further characterized that control means is mounted on said vehicle for operating the injector at selected intervals to cause a discharge of the particulate matter entrained liquid stream.

7. The apparatus of claim 6 further characterized in hat the control means is a manually operable means which is operated by the operator of the apparatus.

8. The apparatus of claim 6 further characterized in that the control means is an automatically operable means for automatically operating the injector at selected intervals.

9. The apparatus of claim 1 further characterized in that the particulate matter inlet port is located at a substantial acute angle relative to the direction of the high pressure stream of liquid.

10. An apparatus for perforating a ground surface and forming a series of successive holes in the ground surface and depositing a particulate matter in the holes thus formed in the ground surface from an injector closely spaced to the ground surface, said apparatus comprising:

a) a power driven vehicle for movement along a ground surface;

b) a water supply tank carried with said vehicle and providing a source of water;

c) pumping means for delivering a stream of water from the supply tank under pressure;

d) a particulate matter supply tank carried with said vehicle and providing a charge of particulate matter;

e) means for maintaining the particulate matter in the particulate matter supply tank in a relatively water isolated environment;

f) discharge control means for selectively discharging a sequential charge of the particulate matter from the particulate matter supply tank;

g) a particulate matter delivery line for delivery of the charge of particulate matter in a relatively water free environment;

h) an injector carried by said vehicle for receiving the water and the particulate matter and causing the particulate matter to be carried into the water, said injector being comprised of:

1) a housing having a port to receive water, 2) means forming a venture chamber in said housing, 3) means in said housing to cause the water to enter into the venturi chamber forming a high pressure water stream with a high flow rate thereby creating a venturi effect therein, 4) a particulate matter port connected to the particulate matter delivery line and leading into the venture chamber for causing the particulate matter to be sucked therein and brought into contact the high pressure water stream passing therethrough to form a particulate matter entrained stream of water, 5) said high pressure stream of water first being introduced into said venturi chamber and then starting the venture effect so that the particulate matter is drawn into the venturi chamber after the high pressure stream of water first enters the chamber, 6) a discharge means on said housing for causing the high pressure water stream without any particulate matter therein to bore a hole into a ground surface immediately followed by the particulate matter entrained stream of water being introduced into the hole to deposit the entrained particulate matter int he ground;

i) valve means for controlling delivery of the high pressure stream of water to be injector and allowing the high pressure stream of water without entrained particulate matter to be discharged through the discharge means to immediately form a hole in the ground of a desired depth immediately followed by the particulate matter entrained stream of water so that the high pressure stream of water without particulate matter first contacts the ground surface to form a hole followed by introduction of the particulate matter entrained stream of water to enable the particulate matter to effectively enter a pre-formed hole, and where there is a stream of water under high pressure remaining and entering the injector after the charge of particulate matter has been ejected;

j) the particulate matter port being closely spaced to the discharge means in the injector and the discharge means being closely spaced to the ground surface and the amount of time the particulate matter remains in contact with the high pressure stream of water in the injector being relatively short so that the particulate matter absorbs only very little water before entering the hole in the ground; and k) control means for controlling the actuation of the valve means at selected intervals to cause a discharge of the particulate matter entrained stream of water during movement of the power driven vehicle.

11. the apparatus of claim 10 further characterized in that the means to cause the water to enter into the venturi chamber is a nozzle having a small diameter orifice.

12. A method for perforating the ground surface and forming holes therein and introducing highly hygroscopic particulate matter in the holes formed therein, said method comprising:

a) delivering liquid from a supply thereof;

b) forming a stream of liquid under high pressure;

c) delivering a charge of particulate matter from a source of the particulate matter;

d) causing a venturi effect by delivery of a high pressure stream of liquid at a velocity sufficient to cause a venturi effect;

e) introducing the charge of particulate matter through the venturi effect into contact with the high pressure stream of liquid and allowing the particulate matter to be carried in the high pressure stream of liquid to thereby form a particulate matter entrained stream of liquid;

f) initially introducing a portion of the high pressure stream of liquid which has no particulate matter therein onto a ground surface to form a hole in the ground;

g) ejecting the particulate matter entrained stream of liquid into the pre-formed hole in the ground in close proximity to the point where the high pressure stream of liquid contacts the particulate matter so that the particulate matter enters the pre-formed hole thereby allowing the particulate matter to remain in the hole;

h) controlling the amount of time the high pressure stream of liquid is delivered to the injector thereby allowing the particulate matter to remain in contact with the high pressure stream of liquid for only a very short time, such that the particulate matter absorbs only a very small amount of water before being deposited in the ground; and i) further introducing a stream of liquid also under high pressure after the charge of particulate matter has been introduced into the pre-formed hole to ensure that all particulate matter in the charge has been sued and removed form the injector.

13. The method of claim 12 wherein said method comprises:

a) dispensing the particulate matter from a flexible container having no air inlet vent therein;

b) permitting the container to collapse around the remaining particulate matter in the container as the particulate matter is withdrawn therefrom;

c) introducing the particulate matter into contact with the high pressure stream of liquid to thereby form the particulate matter entrained stream of liquid immediately prior to ejecting to a ground surface; and d) ejecting the particulate matter entrained stream of liquid from a nozzle into the ground immediately after contact of the particulate matter with the high pressure stream of liquid.

14. An apparatus for forming holes in a ground surface and thereafter introducing a highly hygroscopic particulate matter into the holes formed in the ground surface from an injector closely spaced to the ground surface but not penetrating the ground surface, said apparatus comprising:

a) means for delivery of a liquid under pressure from a supply thereof;

b) an injector for receiving the liquid from the means for delivery and forming a high pressure stream of liquid;

c) a venturi chamber in said injector and receiving the stream of liquid at a flow rate sufficient to cause a venturi effect in said chamber;

d) a particulate matter inlet port in said injector for enabling a charge of a highly hygroscopic particulate matter to be brought into said chamber by virtue of a negative pressure caused by the venturi effect and enabling the particulate matter to be brought into contact with the high pressure stream of liquid to form a particulate matter entrained stream of liquid;

e) said high pressure stream of liquid first being introduced into said venturi chamber and then starting the venturi effect after the high pressure stream of liquid has first entered the chamber so that the particulate matter is drawn into the venturi chamber after the high pressure stream of liquid first enters the chamber;

f) a discharge port in very close proximity to the ground surface to permit ejection of the high pressure stream of liquid without particulate matter therein immediately followed by the particulate matter entrained stream of liquid into the hole in the ground surface and deposition of the particulate matter into the hole in the ground surface;

g) valve means for controlling the delivery of the high pressure stream of liquid to the injector and allowing the high pressure stream of liquid to be delivered into said venturi housing before the charge of particulate matter has been drawn into the chamber, such that the high pressure stream of liquid without entrained particulate matter first contacts the ground surface to form a hole followed by introduction of the particulate matter entrained stream of liquid into the hole so that the particulate matter effectively enters a pre-formed hole; and h) the particulate matter inlet port being closely spaced with respect to the high pressure stream of liquid entering the injector and the discharge port being closely spaced to the ground surface so that the amount of time the particulate matter remains in contact with the high pressure stream of liquid in the injector being relatively short so that the particulate matter absorbs only very little liquid before entering the ground.

15. An apparatus for perforating a ground surface and forming a series of successive holes in the ground surface and depositing a particulate matter in the holes thus formed in the ground surface from an injector closely spaced to the ground surface, said apparatus comprising:

a) a power driven vehicle for movement along a ground surface;

b) a water supply tank carried with said vehicle and providing a source of water;

c) pumping means for delivering a stream of water from the supply tank under pressure;

d) a particulate matter supply tank carried with said vehicle and providing a charge of particulate matter;

e) means for maintaining the particulate matter in the particulate matter supply tank in a relatively water isolated environment;

f) discharge control means for selectively discharging a sequential charge of the particulate matter from the particulate matter supply tank;

g) a particulate matter delivery line for delivery of the charge of particulate matter in a relatively water free environment;

h) an injector carried by said vehicle for receiving the water and the particulate matter and causing the particulate matter to be carried into the water, said injector being comprised of:

1) a housing having a port to receive water, 2) means forming a venturi chamber in said housing, 3) means in said housing to cause the water to enter into the venturi chamber forming a high pressure water stream with a high flow rate thereby creating a venturi effect therein, 4) a particulate matter port connected to the particulate matter delivery line and leading into the venturi chamber for causing the particulate matter to be sucked therein and brought into contact with the high pressure water stream passing therethrough to form a particulate matter entrained stream of water, 5) said high pressure stream of water first being introduced into said venturi chamber and then starting the venturi effect so that the particulate matter is drawn into the venturi chamber after the high pressure stream of water first enters the chamber, 6) a discharge means on said housing for causing the high pressure water stream without any particulate matter therein to bore a hole into a ground surface immediately followed by the particulate matter entrained stream of water being introduced into the hole to deposit the entrained particulate matter in the ground;

i) valve means for regulating the delivery of the high pressure stream of liquid to the injector and thereby allowing the high pressure stream of water without entrained particulate matter to be discharged through the discharge means to immediately for a hole in the ground of a desired depth immediately followed by the particulate matter entrained stream of water so that the high pressure stream of water without particulate matter first contacts the ground surface to form a hole followed by introduction of the particulate matter entrained stream of water to enable the particulate matter to effectively enter a pre-formed hole;

j) the particulate matter port being closely spaced to the discharge means in the injector and the discharge means being closely spaced to the ground surface and the amount of time the particulate matter remains in contact with the high pressure stream of water in the injector being relatively short so that the particulate matter absorbs only very little water before entering the hole in the ground; and k) control s for controlling the actuation of the valve means at selected intervals to cause a discharge of the particulate matter entrained stream of water during movement of the power driven vehicle.

* * * * *